Dec. 1, 1959  J. W. WHITE  2,915,489
METHOD OF COAGULATING RUBBER LATICES
Filed Sept. 19, 1956
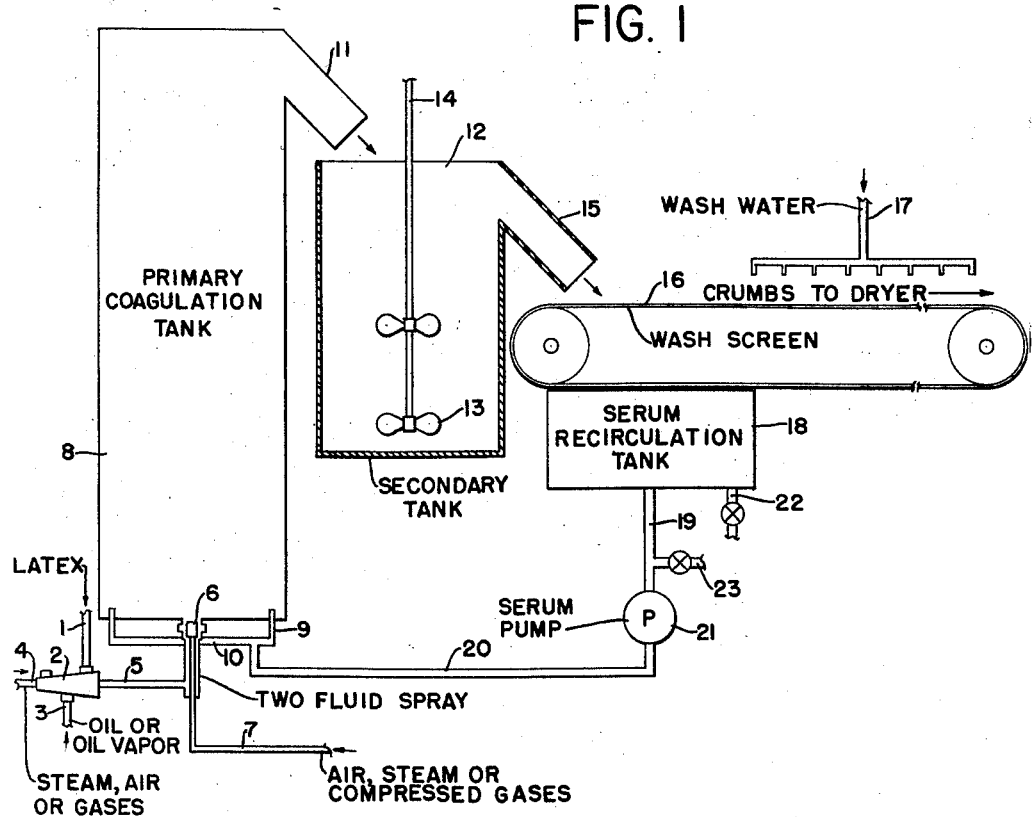
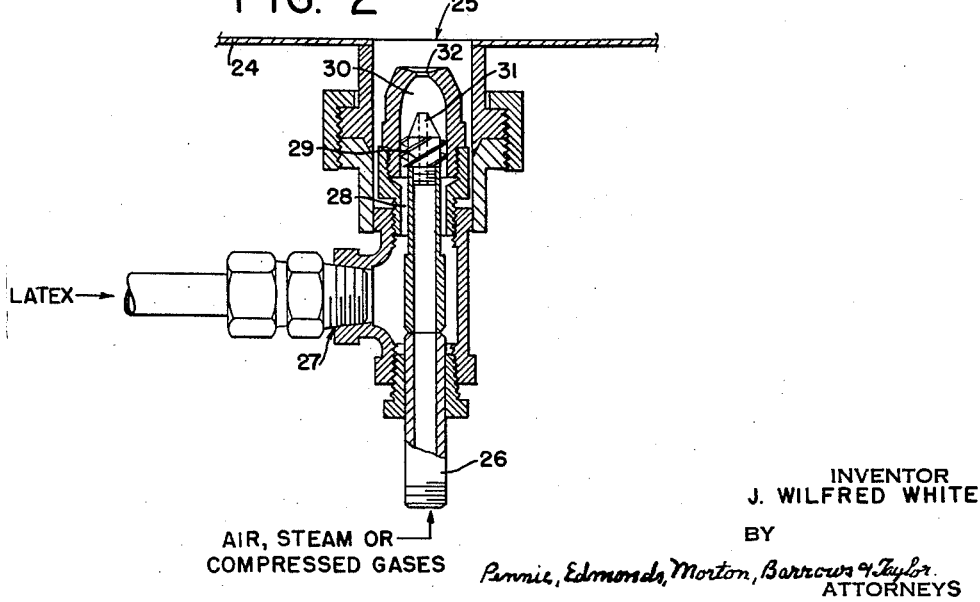
INVENTOR
J. WILFRED WHITE
BY
Pennie, Edmonds, Morton, Barrows & Taylor
ATTORNEYS

United States Patent Office

2,915,489
Patented Dec. 1, 1959

2,915,489

METHOD OF COAGULATING RUBBER LATICES

James Wilfred White, West Monroe, La., assignor to Columbian Carbon Company, New York, N.Y., a corporation of Delaware Application September 19, 1956, Serial No. 610,806

7 Claims. (Cl. 260—33.6)

The present invention relates to improvements in the processing of rubber latices and provides an improved method for effecting the coagulation of rubber from colloidal emulsion thereof, generally known as rubber latex.

The invention is of particular utility as applied to the coagulation of synthetic rubber latices but is also applicable to natural rubber latex.

In the compounding of rubber for the manufacture of automobile tires, for instance, it is conventional practice to disperse carbon black and other compounding ingredients in the rubber by dry milling in a Banbury mixer, or the like. Before such milling can be effected, the rubber must be coagulated and separated from the latex serum. The coagulation is usually effected by mechanically agitating the latex with an acid medium. But it has heretofore been found necessary to subject the latex to a preliminary creaming step prior to such acid coagulation.

The procedure has usually entailed the following steps: (1) mixing a brine, i.e. salt solution, or other creaming agent with the latex, (2) introducing the resultant creamed latex into an acid coagulating medium and mixing by mechanical agitation, and (3) precipitating, washing and drying the resultant rubber crumb.

The creaming step appears to effect a primary flocculation of the rubber and tends to lessen the tackiness of the rubber encountered in the early stages of the acid coagulation. Without the preliminary creaming step, agitation during the acid coagulation has resulted in the formation of large clumps of partially coagulated latex which are difficult to break up for subsequent washing and drying.

The present invention provides an improved method for coagulating rubber latices whereby the customary creaming step may be entirely avoided. Not only is the creaming step, and the expense thereof, eliminated by my process, but the resultant rubber crumb is more readily washed and dried, and undesirable side effects of the salt creaming are avoided. Even more important is the fact that automobile tires produced from rubber coagulated in accordance with my present invention have been found by actual tests to have road wear resistance, as determined by conventional test methods, about 20% in excess of that of tires made from rubber which had been subjected to salt creaming and conventional coagulating methods.

In accordance with my invention, the latex is mixed with an acid coagulating medium, without preliminary creaming and without mechanical agitation, by atomizing the latex upwardly into a body of the liquid acid coagulating medium of substantial depth. The latex, as previously noted, may be either a natural rubber latex or a synthetic rubber latex, for instance GRS i.e. Government Rubber Styrene, either hot or low temperature polymers, and, where desired, may be premixed with a compounding oil to form so-called oil extended polymers.

The atomizing of the latex into the body of acid medium is effected by a so-called Two-Fluid Spray type atomizer, using either steam, compressed air or other substantially inert gaseous medium under pressure. More advantageously, the latex or oil extended polymer is sprayed into the acid coagulating medium at an average droplet size of the order of 200 microns or smaller.

The resultant coagulation produces lacy agglomerates having a sponge-like network structure which is easily broken down for ready washing and drying. These sponge-like agglomerates are floated upwardly through the body of acid medium and, together with a portion of the acid medium, are transferred to a second chamber which is provided with mechanical agitators adapted to break up the agglomerates into rubber crumbs, advantageously of about ½ inch to ¾ inch in diameter. These crumbs are separated from the acid medium or serum, as by screening, and the crumbs washed and thereafter dried by conventional procedure.

Advantageously, the serum, or a portion thereof, separated from the rubber crumb, is recycled to the lower portion of the coagulating tank to assist in floating the sponge-like agglomerates upwardly and out of the tank. More advantageously, the latex is sprayed into the coagulating tank substantially axially and the recycled serum is introduced into the bottom of the coagulating tank at a plurality of points symmetrically positioned near the periphery of the coagulating tank.

The acid coagulating medium may be of the type conventionally used for coagulating rubber latices. Its pH is subject to the usual variation of about 1 to about 3.5, but I have found a pH within the range of about 1.5 to about 3 to give general satisfactory results.

I have found that most satisfactory results are obtained where both the latex and the gaseous atomizing medium are supplied to the Two-Fluid Spray nozzle under considerable pressure, i.e. in excess of 50 pounds per square inch, and preferably in excess of 100 pounds per square inch. I have further found that the necessary atomization of the latex is more readily accomplished by using a spray nozzle of the type hereinafter more fully described connected so that the gaseous atomizing medium enters the nozzle centrally and the latex enters as an outer annular stream.

The body of acid coagulating medium into which the latex is sprayed should be of substantial depth, i.e. sufficient to permit adequate mixing of the atomized latex with the acid medium in the lower portion of the tank and the floating of the resultant agglomerates upwardly away from the zone of atomization and out of the tank as previously described.

The invention will be more fully described and illustrated with reference to the accompanying drawings of which Fig. 1 is a flow diagram of a presently preferred embodiment of the process, and Fig. 2 is a detailed sectional view of a Two-Fluid Spray type atomizer which I have used with particular advantage in spraying the latex into the body of acid coagulating medium.

It will be understood that the particular embodiment of the invention represented by the drawings is illustrative and that various modifications thereof are contemplated within the scope of the appended claims.

The flow diagram of Fig. 1 represents an operation in which the rubber latex is mixed with a rubber compounding oil to form an oil extended polymer prior to coagulation.

The oil extended polymer may be prepared by any of a number of known methods, but as shown in the drawing, it is formed by passing the latex under pressure through line 1 into a downstream chamber of an eductor-type mixer 2, advantageously of the Schutte and Koerting type, and passing the oil or oil vapor, under pressure, through conduit 3 and steam, air or other substantially inert gas under pressure through conduit 4 into an upstream chamber of the mixer. The resultant oil extended polymer is passed from the mixer through conduit 5 to a Two-Fluid Spray type atomizer 6, as hereinafter more fully described, and the atomizing gas consisting of steam, air or other substantially inert gaseous medium, under pressure, is passed to the atomizing nozzle through conduit 7.

By atomizer 6, the oil extended polymer is atomized and the atomized stream injected upwardly, coaxially, into the bottom of a vertically elongated cylindrical coagulation tank 8 filled with an acid coagulating medium advantageously at a pH within the range of 1.5–3. Recycled serum is injected upwardly into the bottom of tank 8 through a plurality of inlet tubes 9 connected to header 10. These inlet tubes 9 enter chamber 8 at points near the periphery of the chamber symmetrically positioned about the atomizer 6. It is usually advantageous to employ from four to six or more of these serum inlet tubes 9.

Upon contact with the acid coagulating medium, the atomized latex is rapidly coagulated, as previously described herein, to form aggregates of sponge-like structure which are continuously floated upwardly through the coagulating tank 8 by the upwardly flowing serum. These sponge-like aggregates are carried out of the upper end of tank 8 through chute 11 by the overflowing serum into a secondary tank 12, which is equipped with propeller blades 13 secured to rotatably mounted shaft 14 adapted to be rotated at high speed, by any suitable means not shown. In the apparatus specifically illustrated, two 3-bladed, 10-inch marine propellers operating at 1000 r.p.m. have been used.

By this propeller action, the sponge-like aggregates discharged into tank 12 from coagulating tank 8 are readily broken up into crumbs of about ½ inch to ¾ inch in diameter to facilitate separation of the serum from the coagulated rubber and the washing and drying of the resultant crumb.

Tank 12 is likewise filled with an acid coagulating medium similar to that in tank 8, and the serum carrying the crumb rubber in suspension overflows through chute 15 onto a separating and washing screen 16 of the continuous type. The separated crumb rubber is carried by the moving screen beneath the water sprays 17 for washing the crumb and from thence is conveyed to conventional drying apparatus not shown.

The serum separated from the crumb rubber is collected in serum recirculation tank 18 and from thence is passed through conduits 19 and 20 to header 10 by means of the circulating pump 21. Serum in excess of that desired to be recirculated may be withdrawn from tank 18 through valved connection 22. Acid coagulating medium necessary to maintain the serum at the desired acidity may be introduced into conduit 19 through valved connection 23.

Where it is desired to coagulate a latex unmixed with oil extender, the mixer 2 is eliminated or by-passed and the latex passed directly from conduit 1 to conduit 5. In either case, there is no preliminary creaming of the latex.

In Fig. 2, there is illustrated a Two-Fluid Spray type atomizer which I have used with particular advantage. The bottom of coagulating tank 8 is represented at 24 and is centrally provided with an opening 25 through which the atomized latex is injected upwardly into the tank and beneath which the atomizer is secured to the bottom of the tank by any suitable means.

The gaseous atomizing medium is passed to the spray from conduit 7 through axially positioned conduit 26. The latex to be coagulated enters the spray from line 5 through inlet 27 and flows upwardly through annular space 28 surrounding conduit 26. At the upper end of the annular space 28, the latex is given a violent whirling motion by passing through the spiral passages 29 and, with continued whirling, passes therefrom into the spray nozzle cap 30, where it is brought into violet impact with a jet of atomizing gaseous medium issuing from jet tube 31, resulting in the shattering of the whirling latex stream, and the injection of latex in atomized form through spray orifice 32 into the body of acid coagulating medium in tank 8.

The atomizing nozzles of the general type described as suitable for use in accordance with my invention are commercially available. It will be understood that the invention is not restricted to the use of the particular type of atomizer illustrated but contemplates the use of any atomizer adapted to effect an equivalent extent of atomization of the latex into the coagulating medium.

The invention will be further illustrated by the following specific examples.

*Example I*

In the apparatus as shown, except that the mixer 2 was omitted, a latex of synthetic rubber (GR–S), containing 19.2% solids, was charged directly to the atomizer, without preliminary creaming, at the rate of 300 pounds per hour and at a pressure of 110 pounds per square inch, and was finely atomized by means of air at a pressure of 110 pounds per square inch into a coagulating tank, such as represented at 8, filled with acid coagulating medium, at a pH maintained within the range of 1.5–3.0. Separated serum was recirculated to the tank at the rate of 25 gallons per minute. There resulted sponge-like aggregates which were floated upwardly and out of the tank into the secondary tank, equipped as described, and were readily broken up by the mechanical agitation to crumbs of ½ inch to ¾ inch diameter which were then washed and dried as usual.

For comparative purposes, an identical latex was first subjected to salt creaming and then acid coagulated and washed and dried by conventional procedure. Rubber stocks were identically compounded from the respective batches, were subjected to optimum cure and thereafter identically tested by conventional methods. Test results are set forth in the following tabulation:

| Sample | Modulus L–300 | Tensile Strength | Elongation | Elec. Res. Log. R. | Rebound | Abr. Resist. |
|---|---|---|---|---|---|---|
| Salt Creamed | 1,350 | 3,075 | 625 | 4.6 | 57.4 | 100 |
| Applicant's Process | 1,390 | 3,275 | 640 | 5.0 | 59.0 | 104 |

The superiority of the product produced in accordance with the present invention is further shown by a tire road wear rating of 120%, based on a road wear rating of 100% for the stock produced from the same type of rubber coagulated by conventional methods.

*Example II*

In an operation similar to that of Example I, a prepared oil extended polymer containing 27.5% of oil extended solids was charged to the atomizer at the rate of 250 pounds per hour and at a pressure of 125 pounds per square inch. Air at a pressure of 125 pounds per square inch was charged to the atomizer. The acidity of the serum was maintained within the range 1.5–3.0 and the serum was recirculated at the rate of 25 gallons per minute. An excellent crumb was obtained as in the preceding example.

Comparative test samples were prepared and tested as in Example I with the results set forth in the following tabulation:

| Sample | Tensile Strength | Elongation | Elec. Res. Log. R. | Rebound | Abr. Resist. |
|---|---|---|---|---|---|
| Salt Creamed | 3,050 | 500 | 3.4 | 57.9 | 100 |
| Applicant's Process | 3,325 | 575 | 3.8 | 59.9 | 110 |

*Example III*

"Butaprene" rubber latex containing 20% solids was charged to the apparatus represented by flow sheet Fig. 1 of the drawings at the rate of 300 pounds per hour, and at a pressure of 60 pounds per square inch. A rubber compounding oil was charged at a rate of 15 pounds per hour and at a pressure of 60 pounds per square inch to the mixer through line 3, and steam at a pressure of 60 pounds per square inch was charged to the mixer through line 4 to emulsify and mix the oil. Atomizing air at a pressure of 60–80 pounds per square inch was charged to the atomizer through line 7 and serum was recirculated at the rate of 50 gallons per minute. A propeller of the type specifically described was operated in the secondary tank at a rate of about 1000 r.p.m. There resulted from this operation a fine, readily washable crumb of a diameter within the range of about ½ inch to ¾ inch.

Comparative samples of stocks were compounded, as in Example I, each cured for 30 minutes and identically tested as in the preceding examples with the following results:

| Sample | Modulus L-300 | Tensile Strength | Elongation | Elec. Res. Log. R. | Rebound |
|---|---|---|---|---|---|
| Salt Creamed | 900 | 3,075 | 680 | 3.2 | 52.0 |
| Applicant's Process | 925 | 3,400 | 670 | 3.7 | 60.5 |

In the foregoing examples, I have used a spray nozzle of the type shown in the darwings having a one inch i.d. spray exit port. However, the nozzle size is subject to considerable variation, depending upon the desired feed rate and the capacity of the apparatus. Optimum feed rate has been found to vary within the range of from ⅓ pound to 4 pounds per hour for each gallon of total coagulation capacity, i.e. the total capacity of the primary and secondary coagulation tanks.

It will be understood that the pressures, feed rates, acid concentrates, and the like, illustrated in the foregoing examples, are subject to considerable variation depending upon the particular latex being coagulated and other operating conditions. For instance, in apparatus of comparable size the latex feed rate may vary from 50 to 600 pounds per hour and the pressure at which it is passed to the atomizer may vary within a range of from 50 to 125 pounds per square inch. The pressure of the atomizing air should usually be approximately equal to that of the latex passed to the atomizer. The pH of the acid coagulating medium may be varied from about 1 to about 3.5 and the serum recirculation rate may be varied over a considerable range to control contact time between the rubber and the acid serum.

The rate at which the serum is recirculated is also subject to considerable variation, as just noted, depending upon other operating conditions indicated above, including apparatus capacity and feed rate. Optimum recirculation rate has usually been found to lie within a range which will provide a total contact time in the coagulation tanks of from 3 to 10 minutes, depending primarily upon the type of latex.

The optimum depth of the primary coagulation tank has been found to vary with the size of the spray, the pressure under which the spray is injected, latex feed rate and the like. I have found, however, that the depth of the primary spray tank should usually not be less than 4 to 5 feet, even for low capacity apparatus. Most advantageously the depth of the primary spray tank, in the particular apparatus shown, is approximately three times its diameter.

It will be understood that the designations GRS and GR–S appearing herein are abbreviations for Government Rubber Styrene produced by emulsion polymerization of butadiene and styrene. It will also be understood that the material herein designated "Butaprene" is the commercially available product marketed under that trademark and consisting essentially of copolymers of butadiene.

I claim:

1. In the acid coagulation of rubber latices in which the latex is mixed with an acid coagulating medium, the steps of atomizing the latex by means of a gaseous medium under superatomospheric pressure upwardly into the lower end of a vertically elongated chamber containing a body of the acid coagulating medium, mixing the latex with the coagulating medium by means of the atomizing action, without mechanical agitation, floating the resultant sponge-like agglomerates of coagulated rubber upwardly through the body of acid medium and discharging them along with a substantial proportion of the latex serum to a separate chamber and therein breaking up the agglomerates by subjecting them to mechanical agitation, passing the resultant rubber suspension from the second chamber, separating the serum therefrom and recirculating at least a portion of the separated serum to the lower end of the first said chamber and washing and drying the separated crumb rubber.

2. The process of claim 1 in which the latex is thoroughly mixed with an oil emulsion prior to being atomized into the coagulating medium.

3. The process of claim 1 in which the atomization of the latex is to droplet size of approximately 200 microns.

4. The process of claim 1 in which atomization of the latex is effected by means of a gaseous medium under a superatmospheric pressure of not less than about 50 pounds per square inch.

5. The process of claim 1 in which the recirculated serum is returned to the first said chamber at a plurality of points symmetrically positioned about the latex inlet.

6. The process of claim 1 in which the latex is uniformly mixed with an oil extender just prior to the atomization of the latex into the acid coagulating medium.

7. In the acid coagulation of rubber latices in which the latex is mixed with an acid coagulating medium, the steps of continuously flowing the acid coagulating medium upwardly through the vertically elongated chamber, injecting the latex as an atomized spray, in an upward direction into the coagulating medium, flowing upwardly through the lower portion of said chamber, said atomizing of the latex being effected by a gaseous medium under superatomspheric pressure, and mixing the latex with the coagulating medium by the force of said spray in the absence of mechanical agitation, and thereby forming sponge-like agglomerates of the coagulated rubber, floating said agglomerates upwardly through said chamber in the upwardly flowing coagulating medium and discharging the agglomerates together with the coagulating medium into a separate chamber and there breaking up the agglomerates by subjecting them to vigorous mechanical agitation, passing the resultant rubber suspension from the second chamber, separating the coagulated rubber therefrom and recirculating a substantial portion of the separated liquid to the lower end of the first said chamber and washing and drying the separated rubber.

References Cited in the file of this patent
UNITED STATES PATENTS

| | | |
|---|---|---|
| 2,426,127 | Thomas et al. | Aug. 19, 1947 |
| 2,459,748 | Johnson | Jan. 18, 1949 |
| 2,487,263 | Mueller | Nov. 8, 1949 |
| 2,556,260 | Downing | June 12, 1951 |